United States Patent [19] [11] 4,383,902
Frank et al. [45] May 17, 1983

[54] PHOTOPOLYMERIZABLE POLYESTER RESINS, A PROCESS FOR THEIR PRODUCTION AND THEIR USE AS LACQUER BINDERS

[75] Inventors: Walter Frank; Otto Bendszus; Hans-Joachim Traenckner; Hans-Joachim Freier, all of Krefeld, Fed. Rep. of Germany

[73] Assignee: Bayer Aktiengesellschaft, Leverkusen, Fed. Rep. of Germany

[21] Appl. No.: 242,445

[22] Filed: Mar. 11, 1981

[30] Foreign Application Priority Data

Mar. 19, 1980 [DE] Fed. Rep. of Germany ....... 3010428

[51] Int. Cl.$^3$ .............................................. C08F 2/50
[52] U.S. Cl. ........................ 204/159.15; 204/159.19; 525/21; 525/41; 525/42
[58] Field of Search ....................... 204/159.15, 159.19

[56] References Cited

U.S. PATENT DOCUMENTS 3,556,791 1/1971 Suzuki et al. ......................... 96/35.1
3,898,144 8/1975 Rudolph et al. ............... 204/159.15

FOREIGN PATENT DOCUMENTS 1276369 6/1972 United Kingdom .

Primary Examiner—John C. Bleutge
Assistant Examiner—A. H. Koeckert
Attorney, Agent, or Firm—Connolly and Hutz

[57] ABSTRACT

Polyesters containing co-condensed polyalkylene glycol residues as the sole air-drying components are, providing they satisfy certain requirements, an excellent basis for photopolymerizable unsaturated polyester resins which harden under UV-light very rapidly even in extremely thin layers.

9 Claims, No Drawings

PHOTOPOLYMERIZABLE POLYESTER RESINS, A PROCESS FOR THEIR PRODUCTION AND THEIR USE AS LACQUER BINDERS

This invention relates to photopolymerisable polyester resins which are suitable for the production of readily sandable coatings, to a process for the production of these polyester resins and to their use as lacquer binders.

Lacquers based on unsaturated polyester resins are divided into two groups according to their composition and drying or hardening mechanism:

1. During gelation, paraffin-containing polyester resins form a paraffin surface layer which protects the underlying lacquer layers against the inhibiting effect of atmospheric oxygen which would otherwise cause the surface of the lacquer to remain permanently tacky. Where high-gloss lacquer coatings are required, the paraffin layer has to be removed in an additional operation.

2. Polyesters for air-drying polyester resins contain co-condensed residues of polyalkylene glycols, benzyl ethers or $\beta,\gamma$-ethylenically unsaturated ethers (German Auslegeschrifts Nos. 1,024,654 and 1,054,620). The hardening of lacquer film surfaces of air-drying polyester resins is aided by a drying mechanism which is triggered off by the oxygen in the air and which depends upon the type of ethers co-condensed in the polyester. Thus, polyalkylene glycols produce moderate drying whilst $\beta,\gamma$-ethylenically unsaturated ethers produce good drying (defazet 31 (1977) No. 9, pages 370 to 371). Since the lacquers are glossy through the absence of paraffin, the polyesters on which the formulation is based are also known as "gloss polyesters".

The high-speed lacquering machines employed in the furniture industry use light-assisted hardening and, to this end, are equipped with high-pressure UV lamps. Paraffin-containing lacquers have proved to be unsuitable for installations of this type because the heat emanating from the high-pressure lamps prevents the protective paraffin film from forming. Accordingly, the lacquers do not harden sufficiently on the surface and, for this reason, cannot be sanded.

Although gloss polyesters harden quickly under high pressure lamps, their sandability for processing in paint shops with very short cycle times is unsatisfactory. The material used for sanding clogs very quickly, i.e. is poorly utilised. Subsequent hardening to the point where sandability is guaranteed takes several days.

Previous experience in the surface hardening of lacquers based on gloss polyesters has shown that the residues of $\beta,\gamma$-ethylenically unsaturated ethers have hitherto clearly played the leading role. Because of this, it was very surprising to find that, providing they satisfy the requirements stipulated hereinafter, polyesters containing polyalkylene glycol residues as the sole air-drying component are an excellent basis for photopolymerisable unsaturated polyester resins and, even in extremely thin layers, harden under UV light to a state of complete sandability in the short cycle times normally encountered in the furniture industry.

Accordingly, the present invention provides photopolymerisable mixtures containing (a) from 30 to 70 parts by weight of at least one $\alpha,\beta$-ethylenically unsaturated polyester.

(b) from 30 to 70 parts by weight of at least one unsaturated monomer copolymerisable with (a), (c) from 0.5 to 4.0 parts by weight and preferably from 1.0 to 3.0 parts by weight of at least one photoinitiator, and optionally (d) other standard additives, characterised in that the polyester (a) contains at least 28% by weight and preferably at least 30% by weight of residues of $\alpha,\beta$-ethylenically unsaturated dicarboxylic acids, particularly maleic acid and/or fumaric acid residues, from 30 to 50% by weight and preferably from 33 to 45% by weight of polyalkylene glycol residues having an average molecular weight of from 300 to 600 and preferably from 350 to 500, and optionally up to 42% by weight and preferably up to 37% by weight of other alcohol or carboxylic acid residues, the percentages quoted being based in each case on polyester (a).

Particularly preferred polyesters (a) for the unsaturated polyester resins according to the invention contain from 30 to 40% by weight of maleic acid residues and/or fumaric acid residues, from 30 to 45% by weight of polyalkylene glycol residues having an average molecular weight of from 350 to 500, and from 15 to 40% by weight of ethylene/propylene glycol residues and other dicarboxylic acid residues.

The present invention also provides a process for producing these mixtures which is characterised in that the polyester starting components are slowly heated to a temperature of from 170° to 210° C., the water of reaction given off is removed by an inert gas stream and heating is continued until the required molecular weight, the required viscosity or the required acid number is reached, after which the reaction mixture is stabilised with hydroquinone or any other standard commercial stabiliser and (a) from 30 to 70 parts by weight of the polyester thus obtained.

(b) from 30 to 70 parts by weight of at least one monomer copolymerisable with (a), (c) from 0.5 to 4.0 parts by weight of at least one photoinitiator, and optionally (d) other standard additives are mixed with one another.

The present invention also relates to the use of the mixtures according to the invention as lacquer binders.

Although photopolymerisable unsaturated polyester resins of which the polyesters contain polyalkylene glycol residues instead of $\beta,\gamma$-ethylenically unsaturated ether residues are known from British Pat. No. 1,131,617, a high double bond content of the polyester is not recommended in British Pat. No. 1,131,617. There is nothing in this literature reference to suggest any association between double bond content, the absence of $\beta,\gamma$-ethylenically unsaturated ether residues, the presence of polyalkylene glycol residues and the sandability of the coatings.

In addition to maleic acid and fumaric acid residues, the polyesters (a) may also contain residues of other $\alpha,\beta$-ethylenically unsaturated dicarboxylic acids, optionally in admixture with up to 20 mole percent, based on the unsaturated acid component, of aliphatic saturated dicarboxylic acids containing from 4 to 10 carbon atoms or cycloaliphatic or aromatic dicarboxylic acids containing from 8 to 10 carbon atoms or ester-forming derivatives thereof. Examples include the residues of o-phthalic acid, tetrahydrophthalic acid, hydroxysuccinic acid and norbornene acid. Since the use of acids such as these adversely affects the sandability of the lacquer films and since, during production of the polyester, part of the ethylene dicarboxylic acids react to form saturated dicarboxylic acids in secondary reactions, it is preferred to use only fumaric acid and/or maleic acid or their derivatives for producing the polyester. The content of α,β-ethylenically unsaturated dicarboxylic acid residues may be quantitatively determined by mercaptan addition; cf. Analyt. Chemie 21, 1073 (1949).

Preferred polyalkylene glycols for the production of polyester (a) are polyethylene and polypropylene glycols. In addition to these polyalkylene glycols, it is also possible to use other hydroxy compounds for the production of polyester (a), preferably polyhydroxy compounds containing from 2 to 8 carbon atoms and from 2 to 4, preferably 2, hydroxyl groups. Since long-chain polyalkylene glycols, long-chain diols and polyhydroxyl compounds containing more than 2 OH groups impair sandability even in small quantities, preferred polyesters (a) contain, in addition to maleic or fumaric acid residues and the polyalkylene glycol units defined above, up to 42% by weight and preferably up to 37% by weight of short-chain diol residues, preferably ethylene glycol and/or propylene glycol residues and other dicarboxylic acid residues.

The polyesters generally have acid numbers of from 1 to 50, preferably from 10 to 40, OH numbers of from 10 to 80, preferably from 15 to 70, and molecular weights determined as a number average of from 300 to 5,000, preferably from 500 to 2000 (as determined by vapour pressure osmometry in dioxane and acetone; in the event of differing values, the lower value is regarded as correct).

Preferred monomers copolymerisable with the unsaturated polyesters (a) are vinyl and vinylidene compounds, preferably containing α-substituted vinyl groups or β-substituted allyl groups, preferably styrene; but also, for example, nucleus-chlorinated and -alkylated or -alkenylated styrenes, the alkyl groups containing from 1 to 4 carbon atoms, for example vinyl toluene, divinyl benzene, α-methyl styrene, tert.-butyl styrene, chlorostyrenes; vinyl esters of carboxylic acids containing from 2 to 6 carbon atoms, preferably vinyl acetate; vinyl pyridine, vinyl pyrrolidone, vinyl naphthalene, vinyl cyclohexane, esters of acrylic and/or methacrylic acid (preferably vinyl, allyl and methallyl esters) containing from 1 to 4 carbon atoms in the alcohol component, their amides, maleic acid anhydride, maleic acid semiesters and diesters containing from 1 to 4 carbon atoms in the alcohol component, maleic acid semiamides and diamides or cyclic imides, such as N-methyl maleic imide or N-cyclohexyl maleic imide; allyl compounds, such as allyl benzene, and allyl esters, such as allyl acetate, phthalic acid diallyl ester, isophthalic acid diallyl ester, fumaric acid diallyl ester, allyl carbonates, diallyl carbonates, triallyl phosphate and triallyl cyanurate.

In order to protect the polyester resins (a+b) against undesirable premature polymerisation, it is advisable to add from 0.001 to 0.1% by weight, based on component (a), of polymerisation inhibitors or antioxidants during the actual production of the unsaturated polyesters.

Preferred photoinitiators are the compounds normally used, for example benzophenone and, quite generally, aromatic keto compounds derived from benzophenone, such as alkyl benzophenones, halogen-methylated benzophenones according to German Offenlegungsschrift No. 1,949,010, Michlers ketone, anthrone and halogenated benzophenones. Equally effective photoinitiators are anthraquinone and many of its derivatives, for example β-methyl anthraquinone, tert.-butyl anthraquinone and anthraquinone carboxylic acid esters, also oxime esters according to German Offenlegungsschrift No. 1,795,089.

Particularly preferred photoinitiators are benzoin and its derivatives (cf. German Auslegeschrift No. 1,694,149 and German Offenlegungsschrifts Nos. 1,769,168; 1,769,853; 1,769,854; 1,807,297; 1,807,301; 1,919,678).

Other particularly preferred photoinitiators are benzil ketals, such as for example benzil dimethyl ketal, and hydroxyalkyl phenones, such as for example 2-hydroxy-2-methyl-1-phenyl-propan-1-one.

Other suitable photoinitiators are described in J. Kosar's book entitled "Light-Sensitive Systems", J. Wiley & Sons, New York/London/Sydney, 1965.

In addition to standard inhibitors, such as p-benzoquinone, hydroquinone, 3-methyl pyrocatechol or metal compounds in the usual quantities, the polyester resins according to the invention may contain as further additives (d) small quantities of standard carriers and fillers as well as thixotropic agents, such as glass fibers, synthetic fibers, silica and talcum.

The polyester resins according to the invention may be photopolymerized by UV-light or in the presence of radical-forming substances, such as thermal polymerisation initiators.

Photopolymerisation of the coatings to the point where they are completely sandable is best carried out under high-energy high-pressure lamps (mercury vapour lamps). Although low-energy fluorescent lamps may be used, the hardening speed obtained with them is rarely adequate for the high-speed mass-production of furniture.

In the context of the invention, dicarboxylic acid residues are understood to be the dicarboxylic acids —CO—R—Co— reduced by 2 hydroxyl groups, whilst polyalkylene glycol or glycol residues are understood to be the diols —O—R—O— reduced by 2 hydrogen atoms.

The percentages quoted in the following Examples represent percentages by weight unless otherwise indicated.

EXAMPLES

1. Composition of the polyester resins:

| Polyester residues | A (according to the invention) moles | B (according to the invention) moles | C (comparison) moles |
|---|---|---|---|
| maleic acid | 1 | 1.0 | 0.7 |
| phthalic acid | — | — | 0.3 |
| ethylene glycol | 0.75 | — | — |
| propylene glycol | — | 0.80 | 0.80 |
| polyethylene glycol (molecular weight 400) | 0.25 | 0.20 | 0.20 |
| Characteristics | | | |
| acid number | 25 | 28 | 30 |
| viscosity as measured on a 65% solution in styrene at 20° C. [m.Pas] | 1200 | 1350 | 1300 |
| percentage of unsaturated dicarboxylic acid residues | 36.2 | 37.1 | 24.3 |
| percentage of polyalkylene glycol residues | 43.9 | 36.0 | 33.8 |

Following the addition of 0.02% of hydroquinone, the polyesters were produced by melt condensation under nitrogen at a temperature of up to at most 200° C.

On completion of the reaction, the polyesters obtained were dissolved in styrene at 100° C. to form a 65% solution.

2. Polyester resin according to Example 1a of German Auslegeschrift No. 2,113,998 (Comparison)

2550 parts by weight of fumaric acid and 451 parts by weight of 1,2-propylene glycol were slowly heated to 150° C. while nitrogen was passed over. 1441 parts by weight of diethylene glycol, 941 parts by weight of trimethylol propane diallyl ether, 428 parts by weight of diethylene glycol monobutyl ether and 0.34 part by weight of hydroquinone were then added at that temperature. The internal temperature was increased to 180° C. at a rate of 10° C. per hour and condensation was continued up to a viscosity of 800 m.Pas, as measured on a 65% solution in styrene in 20° C., and an acid number of 25.

After cooling to 100° C., 0.01% of hydroquinone was added to the polyester which was then diluted with styrene to 69%. Percentage of unsaturated dicarboxylic acid residues: 35.9% Percentage of polyalkylene glycol residues:

3. Polyester resin according to British Pat. No. 1,131,617, Example II (Comparison)

0.5 mole of fumaric acid, 0.3 mole of citraconic acid anhydride, 0.3 mole of adipic acid, 0.4 mole of polyethylene glycol having a molecular weight of 200 and 0.6 mole of polyethylene glycol having a molecular weight of 300 are subjected to the melt condensation process as described above in (1). For the purpose of fair comparison, the polyester obtained, in contrast to British Pat. No. 1,131,617, was dissolved in styrene (solids content: 65%) rather than in elasticising acrylic acid esters. Acid number 20; viscosity 1450 mPas, as measured on a 65% solution in styrene at 20° C. Percentage of unsaturated dicarboxylic acid residues: 17.1% Percentage of polyalkylene glycol residues (molecular weight 300): 50.8%

4. Application 2.5% of benzoin isopropyl ether was added to the polyester resins obtained and the coating compositions thus obtained were applied to primed woods in a layer thickness of 250 μm. The coatings were hardened for 30 seconds under high-pressure mercury lamps (output 30 watts/cm) arranged to a distance of 15 cm. The following Table demonstrates the superior sandability of the coating compositions according to the invention.

| Base polyester | According to the invention | | | Comparisons | |
|---|---|---|---|---|---|
| | 1 A | 1 B | 1 C | 2 | 3 |
| Sandability after leaving the UV-lamp | very good | very good | moderate | moderate | poor |

We claim:

1. Photopolymerizable mixtures containing
   (a) from 30 to 70 parts by weight of at least one $\alpha,\beta$-ethylenically unsaturated polyester,
   (b) from 30 to 70 parts by weight of at least one unsaturated monomer copolymerizable with (a),
   (c) from 0.5 to 4.0 parts by weight of at least one photoinitiator and, optionally,
   (d) other standard additives, characterised in that the polyester (a) contains at least 28% by weight of residues of $\alpha,\beta$-ethylenically unsaturated dicarboxylic acids, from 30 to 50% by weight of polyalkylene glycol residues having an average molecular weight of from 300 to 600 and optionally up to 42% by weight of other alcohol or carboxylic acid residues, the percentage quoted being based in each case on polyester (a).

2. Mixtures as claimed in claim 1, characterised in that the polyesters (a) contain at least 30% by weight of residues of $\alpha,\beta$-ethylenically unsaturated dicarboxylic acids.

3. Mixtures as claimed in claim 1 or 2, characterised in that the residues of $\alpha,\beta$-ethylenically unsaturated dicarboxylic acids are maleic and/or fumaric acid residues.

4. Mixtures as claimed in claim 1, characterised in that the polyesters (a) contain from 33 to 45% by weight of polyalkylene glycol residues.

5. Mixtures as claimed in claim 1, characterised in that the polyesters (a) contain polyalkylene glycol residues having an average molecular weight of from 350 to 500.

6. Mixtures as claimed in claim 1, characterised in that, in addition to the residues of $\alpha,\beta$-ethylenically unsaturated dicarboxylic acids and the polyalkylene glycol residues, the polyesters (a) contain up to 37% by weight of other alcohol or carboxylic acid residues.

7. Mixtures as claimed in claim 1, characterised in that the polyesters (a) contain from 30 to 40% by weight of maleic and/or fumaric acid residues, from 30 to 45% by weight of polyalkylene glycol residues having an average molecular weight of from 350 to 500, and from 15 to 40% by weight of ethylene and/or propylene glycol residues.

8. A process for producing the mixtures claimed in claim 1, characterised in that the polyester starting components are slowly heated to 170°-210° C., the water of reaction given off is removed by an inert gas stream and heating is continued until the required molecular weight, the required viscosity or the required acid number is reached, after which the reaction mixture is stabilised with hydroquinone or with any other standard commercial stabiliser and
   (a) from 30 to 70 parts by weight of the polyester thus obtained,
   (b) from 30 to 70 parts by weight of at least one monomer copolymerisable with (a),
   (c) from 0.5 to 4.0 parts by weight of at least one photo-initiator and, optionally,
   (d) other standard additives are mixed with one another.

9. A lacquer containing a mixture of claim 1 as lacquer binder.

* * * * *